US 8,108,513 B2

(12) United States Patent
Kiciman et al.

(10) Patent No.: US 8,108,513 B2
(45) Date of Patent: Jan. 31, 2012

(54) REMOTE MONITORING OF LOCAL BEHAVIOR OF NETWORK APPLICATIONS

(75) Inventors: Emre Mehmet Kiciman, Seattle, WA (US); Benjamin Livshits, Kirkland, WA (US); Jiahe Helen Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/862,073

(22) Filed: Sep. 26, 2007

(65) Prior Publication Data

US 2009/0083409 A1 Mar. 26, 2009

(51) Int. Cl.
*G06F 15/173* (2006.01)

(52) U.S. Cl. .......... 709/224; 717/124; 717/127

(58) Field of Classification Search .......... 709/224; 717/124, 127, 128, 129
See application file for complete search history.

(56) References Cited

U.S. PATENT DOCUMENTS

| 5,732,212 | A  | * | 3/1998  | Perholtz et al. ....... 709/224 |
| 6,202,199 | B1 | * | 3/2001  | Wygodny et al. ....... 717/125 |
| 6,282,701 | B1 | * | 8/2001  | Wygodny et al. ....... 709/224 |
| 6,634,001 | B2 |   | 10/2003 | Anderson et al. |
| 7,000,150 | B1 | * | 2/2006  | Zunino et al. ....... 714/38.11 |
| 7,546,584 | B2 | * | 6/2009  | Rovang ....... 717/124 |
| 7,657,625 | B2 | * | 2/2010  | Armanino et al. ....... 709/224 |
| 7,698,692 | B1 | * | 4/2010  | Garud et al. ....... 717/130 |
| 7,747,985 | B2 | * | 6/2010  | Campbell et al. ....... 717/127 |
| 7,779,390 | B1 | * | 8/2010  | Allavarpu et al. ....... 717/124 |
| 7,870,537 | B2 | * | 1/2011  | Lopez et al. ....... 717/127 |
| 2003/0101255 | A1 |   | 5/2003  | Green |
| 2004/0111727 | A1 |   | 6/2004  | Schwarzbauer et al. |
| 2005/0050159 | A1 |   | 3/2005  | Suraski |
| 2005/0132337 | A1 | * | 6/2005  | Wedel et al. ....... 717/128 |
| 2005/0172168 | A1 |   | 8/2005  | Kilian |
| 2005/0198365 | A1 | * | 9/2005  | Wei ....... 709/237 |
| 2006/0095907 | A1 | * | 5/2006  | Barsness et al. ....... 718/100 |
| 2006/0111888 | A1 | * | 5/2006  | Hiew et al. ....... 703/22 |
| 2006/0195588 | A1 | * | 8/2006  | Pennington et al. ....... 709/227 |
| 2006/0277456 | A1 | * | 12/2006 | Biberstein et al. ....... 715/512 |
| 2007/0016672 | A1 |   | 1/2007  | Wilson et al. |
| 2007/0198653 | A1 | * | 8/2007  | Jarnagin et al. ....... 709/217 |
| 2007/0233811 | A1 | * | 10/2007 | Rochelle et al. ....... 709/219 |
| 2008/0046557 | A1 | * | 2/2008  | Cheng ....... 709/224 |
| 2008/0092058 | A1 | * | 4/2008  | Afergan et al. ....... 715/745 |
| 2008/0104224 | A1 | * | 5/2008  | Litofsky et al. ....... 709/224 |
| 2008/0141150 | A1 | * | 6/2008  | Kalaboukis et al. ....... 715/764 |
| 2008/0154933 | A1 | * | 6/2008  | Galvin et al. ....... 707/102 |

OTHER PUBLICATIONS

Defeating Script Injection Attacks with Browser-Enforced Embedded Policies, Trevor Jim, Nikhil Swamy, Michael Hicks, ACM 978-1-59593-654-7/07/0005 May 8-12, 2007.*

(Continued)

*Primary Examiner* — Jeffrey R Swearingen

(57) ABSTRACT

Computer-executable instructions comprising some or all of a program can be delivered to a client for execution on a real-time basis such that the client receives anew the computer-executable instructions for each new execution of the program. Such an environment enables instrumentation instructions to be inserted into the computer-executable instructions after a request and prior to the delivery of the computer-executable instructions. The inserted instrumentation instructions can be spread across multiple deliveries of the same computer-executable instructions, and they can be modified to account for information received from previously inserted instrumentation instructions. The instrumentation instructions can be inserted as part of the server process, the client process, or as part of a proxy server that can be used at the discretion of the program developer.

14 Claims, 10 Drawing Sheets

OTHER PUBLICATIONS

Uehara, Minoru et al. "A Real-Time Retrieval System using Change Aware Distributed File System." Proceedings of the Fourth International Conference on Computer and Information Technology. IEEE. 2004. pp. 831-838.*

Kiciman et al.,"AjaxScope: a Platform for Remotely Monitoring the Client-Side Behavior of Web 2.0 Applications", ACM, 2007, pp. 1-14.

"E-business Transaction and Web Application Monitoring", WebSitePulse, 2000, pp. 2.

Tucek, et al., "Automatic On-line Failure Diagnosis at the End-User Site" University of Illinois at Urbana Champaign, Sep. 18, 2006, pp. 7.

"Remote Machine Debugging" 1998, Microsoft Corporation, pp. 5.

"Remote Administration & Monitoring", Connectria, 2005, pp. 2.

"String Performance in Internet Explorer", Crisp's Blog, Dec. 9, 2006, pp. 6.

Aguilera, et al., "Performance Debugging for Distributed Systems of Black Boxes", 2003, ACM, pp. 16.

Atterer et al., Knowing the User's Every Move—User Activity Tracking for Website Usability Evaluation and Implicit Interaction, WWW2006, pp. 10.

Barham et al., "Using Magpie for request extraction and workload modelling", USENIX Association,2004, pp. 14.

"Performace: Leak Tools", retrieved at <<http://wiki.mozilla.org/Performance:Leak_Tools>>, pp. 9.

Berger et al., "Die Hard: Probabilistic Memory Safety for Unsafe Languages", 2005, ACM, pp. 10.

"Alex Bosworth's Weblog: How to Provide a Web API", Source Labs, pp. 3.

Breen, "Ajax Performance", retrieved at <<http://www.ajaxperformance.com>>, pp. 7.

Chilimbi et al., "Cache-Conscious Coallocation of Hot Data Streams", ACM Press, 2006, pp. 11.

Cohn et al., "Active Learning With Statistical Models", AI Access Foundation and Morgan Kaufmann Publishers, 1996, pp. 129-145.

Cowan et al., "StackGuard: Automatic Adaptive Detection and Prevention of Buffer Overflow Attacks:", USENIX Association, 1998,pp. 16.

"ECMAScript Language and Specification", Standard ECMA-262, 3rd Edition, 1999, pp. 188.

Haldar et al., "Dynamic Taint Propagation for Java", 2005, IEEE , pp. 7.

Chilimbi et al., "Low Overhead Memory Leak Detection Using Adaptive Statistical Profiling", 2004, ACM, pp. 156-164.

Liblit et al., "Scalable Statistical Bug Isolation", 2005, ACM, pp. 12.

Liu et al., "Statistical Debugging: A Hypothesis Testing-Based Approach", vol. 32, No. 10, Oct. 2006, IEEE, pp. 831-848.

Liu et al., "Failure Proximity: A Fault Localization-Based Approach", 2006, ACM, pp. 11.

Martin et al., "Finding Application Errors and Security Flaws Using PQL: a Program Query Language", 2005, ACM, pp. 19.

Livshits et al., "SecuriFly: Runtime Protection and Recovery from Web Application Vulnerabilities", Sep. 22, 2006, Stanford University, pp. 58.

Miller et al., "The Paradyn Parallel Performance Measurement Tools", Computer Science Department, Universitty of Wisconsin-Madison, pp. 1-29.

Nguyen-Tuong et al., "Automatically Hardening Web Application Using Precise Tainting", Department of Computer Science, University of Virginia, pp. 1-12.

"Recent Changes that may break your Gadgets", retrieved at<<http://microsoftgadgets.com/forums/1438/ShowPost.aspx>>, pp. 1-7.

Rinard et al., "Enhancing Server Availability and Security Through Failure-Oblivious Computing" Massachusetts Institute of Technology, Cambridge, pp. 14.

Rubin et al., "An Efficient Profile Analysis Framework for Data-Layout Optimizations", 2002, ACM, pp. 14.

Memory Leaks in Microsoft Internet Explorer, 2006, Schlueterica, pp. 1-8.

Shaham et al., "Estimating the Impact of Heap Liveness Information on Space Consumption in Java", 2002, ACM, pp. 64-75.

Wall et al., "Programming Perl, Third Edition", 2000, O'Reilly, pp. 1-3.

"What is Ajax", pp. 1-13.

Zakas et al., "Professional Ajax", retrieved at <<http://www.wrox.com/WileyCDA/WroxTitle/productCd-0471777781, descCd-description.html>>, p. 1.

"E-business Transaction and Web Application Monitoring", retrieved from http://www.websitepulse.com/services/transaction.monitoring.php on May 4, 2007, p. 2.

Tucek et al., "Automatic On-line Failure Dianosis at the End-User Site", Sep. 18, 2006, p. 7, Dept. of Computer Science, University of Illinois at Urbana Champaign, IL.

Corning, "Remote Machine Debugging", retrieved from http://www.microsoft.com/mind/0911/faq/faq0199.asp on May 4, 2007, p. 5.

"AS/400 (iSeries) Remote Administration & Monitoring", retrieved from http://www.connectria.com/as400_remote.html on May 4, 2007, p. 2.

"String Performance in Internet Explorer", Crisp's Blog, Dec. 9, 2006, http://therealcrisp.xs4all.nl/blog/2006/12/09, p. 6.

Aguilera et al., "Performance Debugging for Distributed Systems of Black Boxes", SOSP '03 Proceedings of the nineteenth ACM Symposium on Operating systems principles, Dec. 2003, p. 16.

Atterer et al., "Knowing the User's every Move-user Activity Tracking for Website Usability Evaluation and Implicit Interaction", WWW '06 proceedings of the 15th int'l conf, p. 10.

Barham et al., "Using Magpie for request extraction and wordload modelling", OSDI '04 Proceedings of 6th Conf. on Symposium on Operating Systems Design & Implementation vol. 6, p. 14.

"Performance: Leak Tools", retrieved from http://wiki.mozila.org/performance:Leak Tools on Jul. 3, 2007, p. 9.

Berger et al., "DieHard: Probabilistic Memory Safety for Unsafe Languages", PLDI '06 Proceedings of 2006 ACM SIGPLAN conference on Programming language design and implementation, Jun. 2006, New York, NY, p. 10.

Bosworth, "Alex Bosworth's Weblog: How to Provide A Web API", retrieved from http://www.sourcelabs.com/blogs/ajb/2006/08 on Jul. 3, 2007, p. 3.

Breen, "Ajax Performance", retrieved from www.ajaxperformance.com on Jul. 3, 2007, p. 7.

Chilimbi et al., "Cache-Conscious Coallocation of Hot Data Streams", PLDI '06 proceedings of 2006 ACM SIGPLAN conference on Programming language design and implementation, Jun. 2006, New York, NY, p. 11.

Cohn et al., "Active Learning with Statistical Models", Journal of Artificial intelligence Research, Jan. 1996, pp. 129-145, vol. 4 Issue 1, AI Access Foundation, USA.

Cowan et al., "StackGuard: Automatic Adaptive Detection and Prevention of Buffer-Overflow Attacks", Proceedings of the 7th USENIX Security Symposium, Jan. 26-29, 1998, p. 16, San Antonio, Texas.

"ECMAScript Language Specification", Standard ECMA-262, Dec. 1999, p. 188, 3rd Edition.

Haldar et al., "Dynamic Taint Propagation for Java", ACSAC '05 Proceedings of the 21st Annual Computer Security Applications Conference, Dec. 5-9, 2005, p. 7, IEEE Computer Society Washington, DC, USA.

Chilimbi et al., "Low Overhead Memory Leak Detection Using Adaptive Statistical Profiling", ASPLOS-XI Procedings of the 11th int'l conference on Architectural support for programming languages and operating systems, 2004, pp. 156-164, ACM, New York, NY, USA.

Liblit et al, "Scalable Statistical Bug Isolation", PLDI '05 proceedings of the 2005 ACM SIGPLAN conference on Programming language design and implementation, 2005, p. 12, ACM, New York, NY USA.

Liu et al., "Statistical Debugging: A Hypothesis Testing-Based Approach", IEEE Transactions on Software Engineering, Oct. 2006, pp. 831-848, vol. 32, No. 10, IEEE Press, Piscataway, NJ, USA.

Liu et al., "Failure Proximity: A Fault Localization-Based Approach", SIGSOFT '06/FSE-14 Proceedings of the 14th ACM SIGSOFT international symposium on Foundations of software engineering, Nov. 5-11, 2006, p. 11, ACM, New York, NY USA.

Martin et al., "Finding Application Errors and Security Flaws Using PQL: a Program Query Language", OOPSLA '05 Proceedings of the 20th annual ACM SIGPLAN conference on Object-oriented programming, systems, languages, and applications, Oct. 16-20, 2005, p. 19, ACM, New York, NY USA.

Livshits et al., "SecuriFly: Runtime Protection and Recovery from Web Application Vulnerabilities", technical report Stanford University, Sep. 22, 2006, p. 58, Palo Alto, California USA.

Miller et al., "The Paradyn Parallel Performance Measurement Tools", IEEE Computer vol. 28, No. 11, Nov. 1995, pp. 37-46.

Nguyen-Tuong et al., "Automatically Hardening Web Applications Using Precise Tainting", 20th IFIP International Information Security Conference, Jun. 2005, pp. 1-12.

"Recent changes that may break your gadgets", retrieved from http://microsoftgadgets.com/forums/1438/ShowPost.aspx on Jul. 3, 2007, pp. 1-7.

Rinard et al., "Enhancing Server Availability and Security Through Failure-Oblivious Computing", OSDI'04 Proceedings of the 6th conference on Symposium on Operating Systems Design & Implementation—vol. 6, Dec. 5, 2004, p. 14.

Rubin et al., "An Efficient Profile-Analysis Framework for Data-Layout Optimizations", Jan. 2002, p. 14, ACM, Portland, OR USA.

Schleuter, "Memory Leaks in Microsoft Internet Explorer", retrieved from http://isaacschlueter.com/2006/10/msie-memory-leaks/ on Jul. 3, 2007, pp. 1-8.

Shaham et al., "Estimating the Impact of Heap Liveness Information on Space Consumption in Java", ISMM 2002, Jun. 20-21, 2001 pp. 64-75, ACM Berlin, Germany.

Wall et al., "Programming Perl, Third Edition", Jul. 2000, pp. 1-3, O'Reily Media, Inc.

Zakas et al., Chapter 1: "What is Ajax", Professional Ajax, Feb. 2006, pp. 1-13.

Wrox::Professional Ajax:Book Information and Code Download, retrieved from http://www.wrox.com/WileyCDA/WroxTitle/productCd-0471777781,descCd-description.html on Jul. 3, 2007, p. 1.

Kiciman et al., "AjaxScope: a Platform for Remotely Monitoring the Client-Side Behavior of Web 2.0 Applications", SOSP '07 Proceedings of Twenty-First ACM SIGOPS Symposium on Operating Systems Principles, Oct. 14-17, 2007, pp. 1-14.

\* cited by examiner

REMOTE MONITORING OF LOCAL BEHAVIOR OF NETWORK APPLICATIONS

BACKGROUND

Traditionally, software, in the form of computer-executable instructions embodied on a computer-readable medium, has been distributed by providing users with a single version of such software through a compact disk (CD) or other computer-readable medium that simultaneously comprises all of the software's computer-executable instructions. Such distribution mechanisms required specific update cycles, where new versions of software were released by announcing their availability and requiring existing users to obtain new CDs or other computer-readable media.

An increasingly popular method of software distribution, however, eschews computer-readable media that simultaneously comprise all of the software's computer-executable instructions in favor of computer-readable media, such as computer networking hardware and connections that deliver the software's computer-executable instructions to a user on an as-needed basis. Such real-time delivery of computer software enables developers to continuously update their software, and allows users to continuously obtain the most up-to-date version. In particular, the software, and distribution environment can be such that the user must obtain the computer-executable instructions from a centralized location each time the user executes the software. In addition, the nature of the software's delivery encourages the use of distributed computing techniques, whereby one or more components of the software would be executing on the user's computing device, while one or more other components of the software would be executing on a centralized server computing device remote from the user's computing device.

Often, software that is delivered using real-time distribution mechanisms seeks to provide platform-independent functionality. For example, one environment in which real-time distribution of software is prevalent is the World-Wide Web (WWW), where software comprises both computer-executable instructions executing on a server computing device and, operating in concert, scripts that are downloaded by and executed by a web browser. Because web browsers exist for a variety of hardware and software platforms, including computing devices based on differing microprocessor architectures and computing devices executing differing operating systems, software that is incompatible with one or more of these platforms risks losing popularity by immediately excluding some percentage of users. Consequently, web-based software delivered in a real-time manner generally seeks to provide functionality for users of multiple computing platforms. Unfortunately, because of the heterogeneity of client computing devices, the developers of software delivered in a real-time manner can be handicapped when attempting to test their software in a manner approximating an expected range of usage once deployed.

As software delivered in a real-time manner increases in complexity, it is not just the heterogeneity of client computing devices that can cause difficulties for the developers of such software. Other factors, such as the workload generated by the software, or its dependence on third-party services and networks, can likewise render the creation and maintenance of such software more difficult.

SUMMARY

To observe and monitor the behavior of computer-executable instructions provided to, and executed on, a client computing device, additional monitoring instructions can be added to the computer-executable instructions to record specific events or other information and then return such information. In one embodiment, a modifying component can intercept instructions being delivered from a server computing device to a client computing device, and can add additional monitoring instructions to the intercepted instructions. Information collected by such monitoring instructions can be returned to the modifying component, or associated elements, and can be used to inform future modifications of the same intercepted instructions when requested again by a client. In an alternative embodiment, the modifying component can add monitoring instructions in such a manner that each client receives only a portion of the overall monitoring being performed with respect to the intercepted instructions.

The modifying component can, in one embodiment, comprise a parser that can identify elements within the intercepted instructions that could be monitored, a filter that selects certain of the elements based on an implemented monitoring policy, and a modifier that modifies the selected elements in accordance with the implemented monitoring policy. Monitoring policies can be directed towards performing runtime analysis and debugging of the intercepted instructions, towards improving the performance, on the client, of the intercepted instructions, or towards performing usability evaluations of the overall software which includes the intercepted instructions. In one embodiment, a monitoring policy can time one or more elements of the intercepted instructions so as to determine if any elements are taking too long to execute on the client computing device. In another embodiment, a monitoring policy can mark all of the elements of the intercepted instructions that either create objects or close objects on the client computing device and the monitoring policy can then search for memory leaks. In a further embodiment, a monitoring policy can mark some or all of the elements of the intercepted instructions that present choices to a user so as to monitor the user's selections and behavior.

The modifying component can be implemented on a separate server computing device from the server hosting the computer-executable instructions being provided to the client computing device, or it can be implemented on the hosting server or even the client computing device. If implemented on a separate server computing device, the hosting server can redirect communications to the server implementing the modifying component, thereby enabling the modifying component to act as a proxy for the hosting of the instructions. Alternatively, if implemented on the hosting server computing device, the modifying component can interface with the hosting software enabling communications with the client computing device. If implemented on the client computing device, the modifying component can act as a plug-in to the software hosting the instructions being downloaded, or it can act as a local proxy.

In a still further embodiment, the modifications can be done in advance such that multiple, differently modified versions of an application can be stored at the modifying component. The modifying component can then dynamically choose which version to provide to a client computing device. Alternatively, rather than performing the modifications in advance, the modifying component can, as it modifies an application, cache the modified application so as to respond more efficiently to subsequent requests. When subsequent requests are received, the modifying component can then choose to respond with a cached version, or it can generate, and, optionally, add to the cache, a new, differently modified version of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
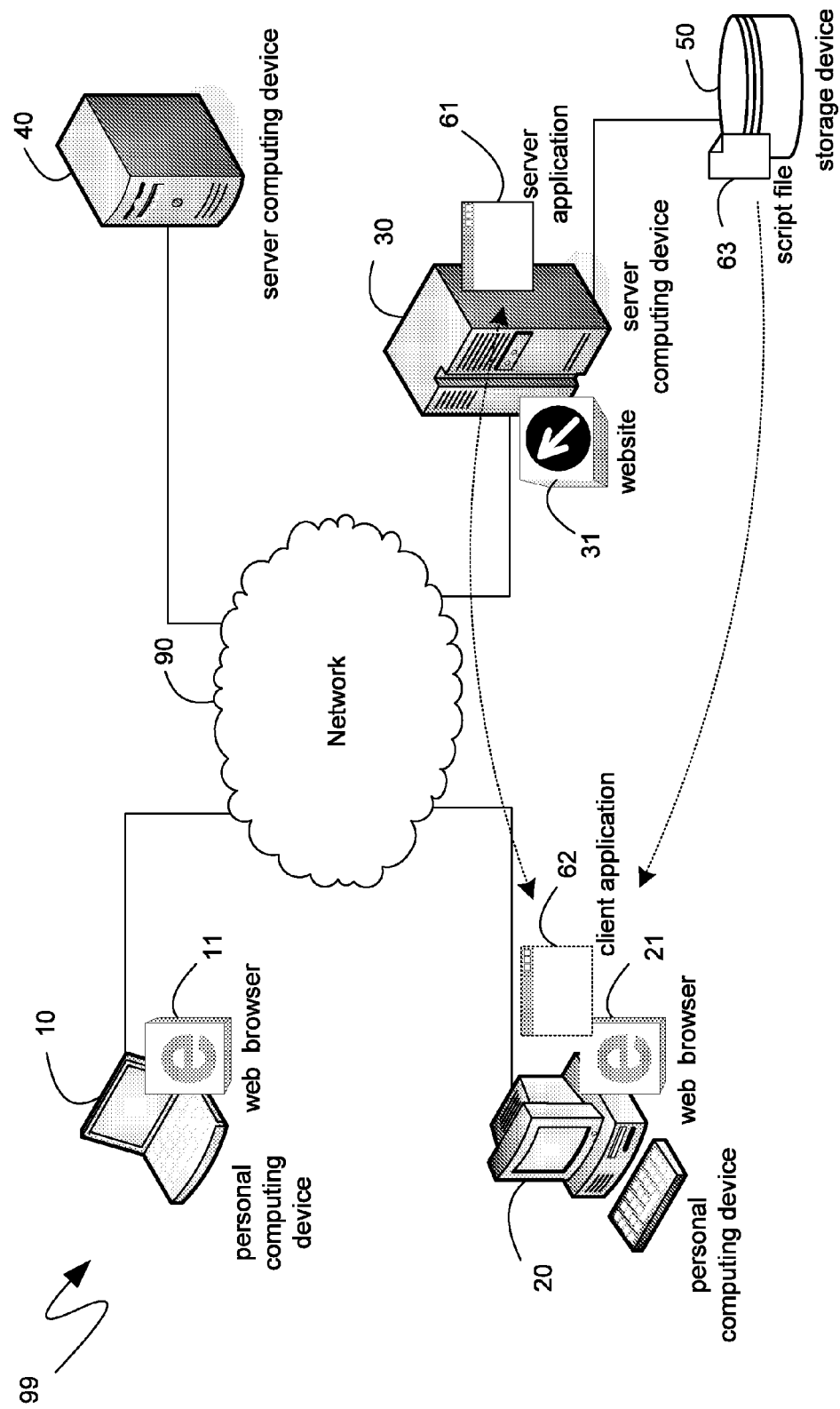
FIG. 1 is a block diagram of an exemplary system that provides context for the described functionality.

The following description relates to the modification of computer-executable instructions representing some or all of a program that is delivered to a user over a network connection each time the user initiates the program. An instruction modification component can reside on the user's computing device, the server computing device hosting the program, or on an intermediate proxy device. A request for the computer-executable instructions from the user's computing device can be directed to the modification component, which, upon receiving such a request, can intercept the delivery of the instructions from the server and can modify the instructions in accordance with one or more instrumentation policies. An instrumentation policy can comprise instruction modifications directed to runtime analysis and debugging, modifications directed to improvements in performance, and modifications directed to user monitoring and improvement of the user experience. The instruction modifications of an instrument policy need not be directed to a single intercepted set of computer-executable instructions, and can, instead, be spread out across multiple instances of the computer-executable instructions being delivered to multiple users, or can even be adaptive in nature, such that the results of an initial set of modifications are used to tailor subsequent modifications of the same computer-executable instructions.

The techniques described herein focus on, but are not limited to, the modification of script-based computer-executable instructions delivered within the context of an environment based on the World Wide Web. In particular, modern web browsers are capable of acting as a host for the execution of scripts received from a server computing device in conjunction with one or more web pages being hosted by the server, or an associated server. The scripts are often designed to interact with one or more collections of computer-executable instructions executing on the server computing device and, in such a manner, perform useful tasks on behalf of the user. Because they work together in concert, the combination of the script-based executable instructions delivered to, and hosted by the web browser, and the computer-executable instructions executing on the server computing device is thought of as a single application, and is commonly known as a web-based application. However, while the descriptions below make reference to web-based environment, and illustrate exemplary instruction modifications with reference to script-based instructions within the context of a web application, the teachings below are not intended to be so limited. Indeed, as will be known to those skilled in the art, the mechanisms described below do not depend on, or require, any element unique to web applications, or the WWW in general, and, as such, are equally applicable to any computer-executable instructions delivered from one computing device to another on an as-needed basis. Such environments can include cluster computing, grid, data center or enterprise computing environments with the appropriate software deployment or software update systems in place.

Turning to FIG. 1, an exemplary network system 99 is illustrated comprising the network 90 itself, personal computing devices 10 and 20, server computing devices 30 and 40, and a storage device 50 associated with the server computing device 30. Each of the personal computing devices 10 and 20 can be executing a web browser 11 and 21, respectively. In addition, the server computing device 30 can be hosting a website 31. As will be known by those skilled in the art, the website 31 can comprise, not only the communicational software necessary to receive, and respond to, requests from web browsers, such as web browsers 11 and 21, but also comprises the one or more related individual web pages, and their associated content, such as embedded images and the like.

The website 31 can comprise one or more web pages that reference scripts, such as those contained in the script file 63 that is stored on the storage device 50. As will also be known by those skilled in the art, the scripts of the script file 63 can be provided to a requesting web browser as part of the web page that referenced those scripts. Thus, as shown in FIG. 1, the web browser 21 can have requested a web page of the web site 31 that incorporated the script file 63 and, as a result, the script file 63 can be provided to the web browser 21. Upon receipt of the script file 63, the web browser 21 can interpret and execute the scripts contained therein, and the execution of those scripts can generate a client application 62. The client application 62, representing the running form of the scripts of the script file 63, can interact with a server application 61 and, together, the combination of the client application 62 and the server application 61 can be considered a single network application, or program, that provides utility to the user of the personal computing device 20.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
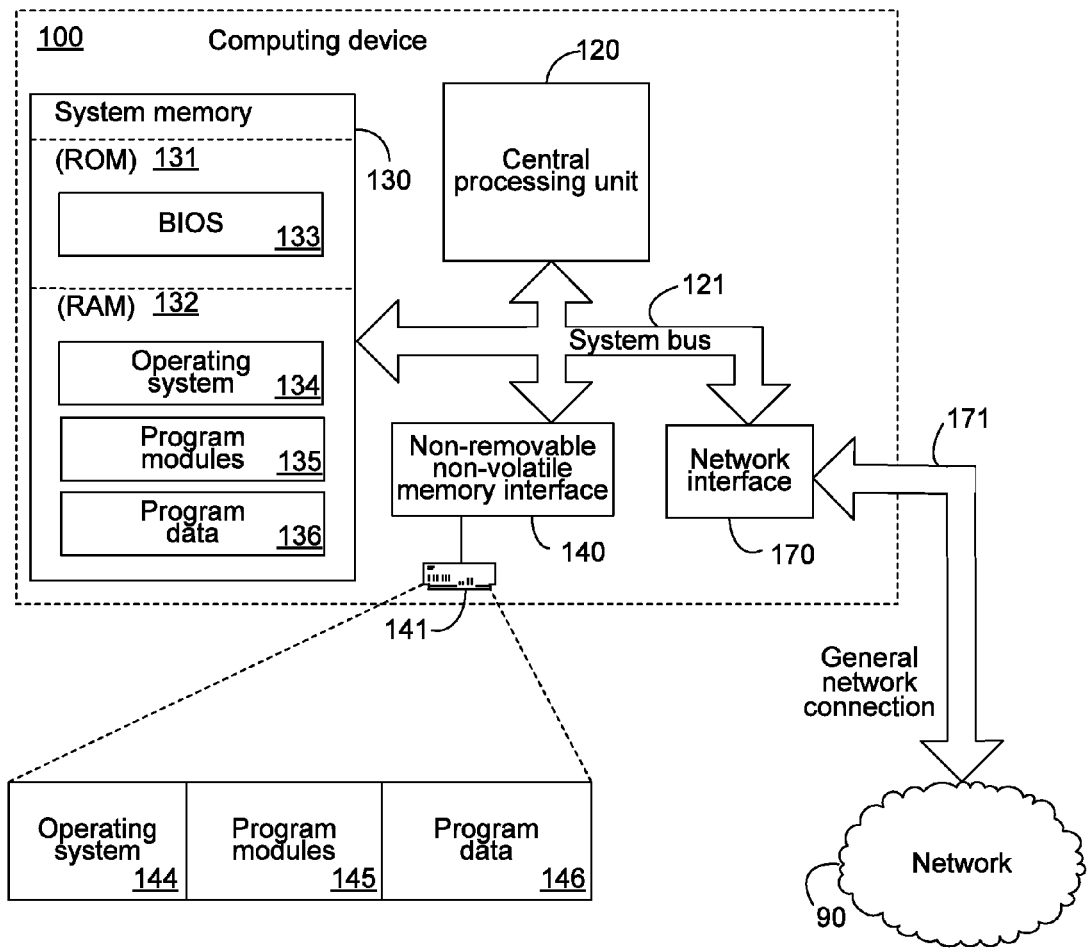
FIG. 2 is a block diagram of an exemplary computing device.

With reference to FIG. 2, an exemplary computing device 100 is illustrated. The computing device 100 can represent any of the computing devices 10, 20, 30 or 40 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

As shown in FIG. 2, the network connection 171 can enable the computing device 100 to obtain program modules from one or more other computing devices in a real-time manner. Thus, for example, each time the program modules are to be executed and loaded into RAM 132, they can be obtained anew from a remote computing device via network connection 171. Alternatively, the program modules, after being obtained from a remote computing device via network connection 171, can be retained in a local cache on the hard disk drive 141 for a short, predetermined amount of time, and can subsequently be loaded into RAM 132 from the local cache. Returning to FIG. 1, if the user of the computing device 20 were to quit the client application 62 and browse, with the web browser 21, to another website, and then subsequently return to the website 31 and seek to use the program comprising the client application 62 and the server application 61, the website 31 could again transmit the script file 63 to the web browser 21 so as to enable the web browser 21 to generate the client application 62. This real-time distribution of the program comprising the client application 62 and the server application 61 enables the developers of such a program to be able to provide immediate updates, as the user receives the latest version of the script file 63 each time they seek to use the program anew.

Figure 3:
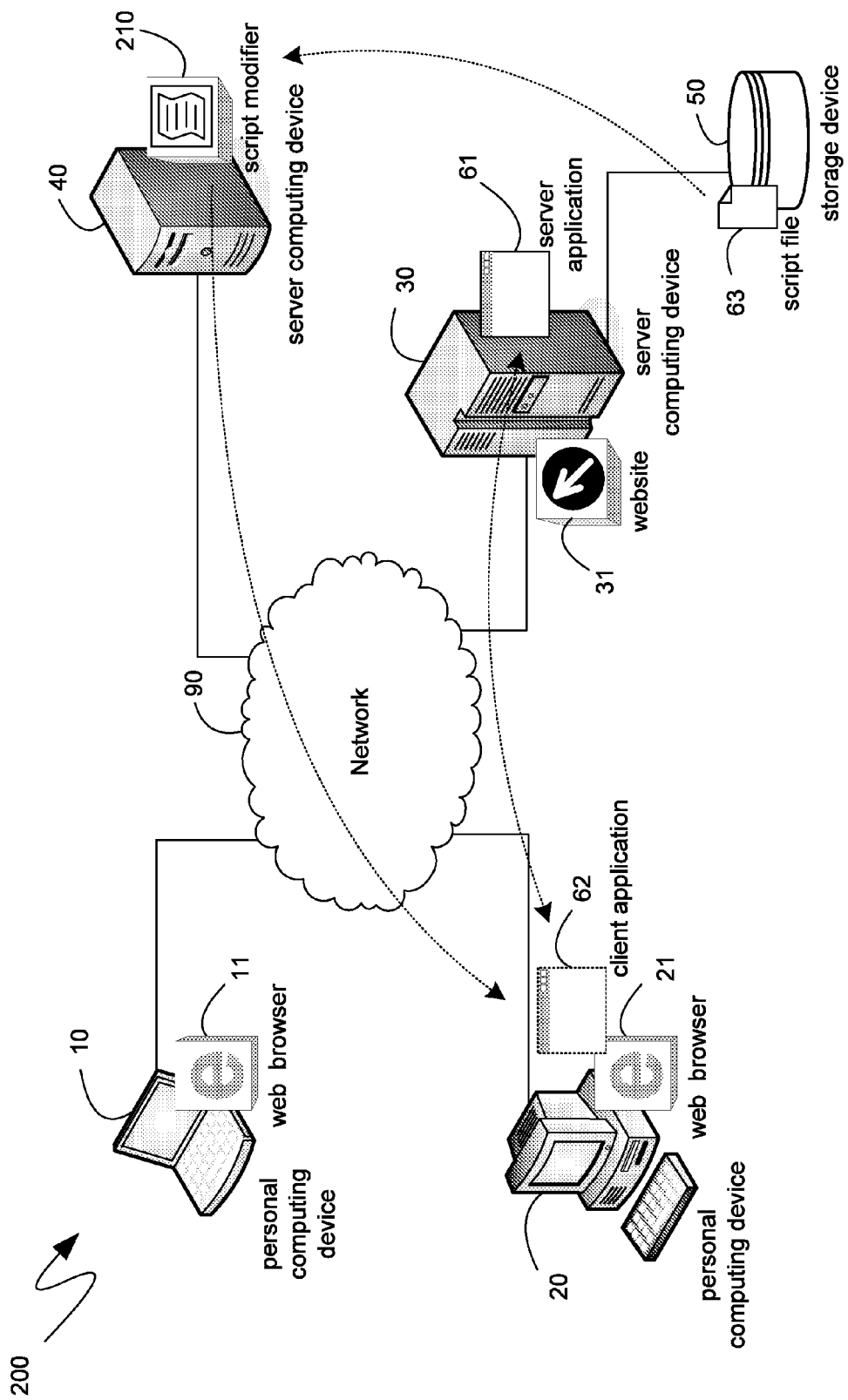
FIG. 3 is a block diagram of an exemplary system illustrating modification of software provided in real-time.

This real-time distribution can be leveraged to modify the scripts of the script file 63 in a continuous manner, and thereby monitor, debug, make more efficient and otherwise improve the user's experience. Turning to FIG. 3, an exemplary network system 200 is shown comprising the personal computing devices 10 and 20, the server computing devices 30 and 40, and the storage device 50 from FIG. 1. However, the exemplary network system 200 further includes a script modifier 210 executing on a server computing device 40. The script modifier 210 can intercept the delivery of the script file 63 from the server computing device 30 to the web browser 21 executing on the client computing device 20, and can modify the scripts of the script file 63 before itself sending the modified scripts to the web browser 21.

In one embodiment, illustrated by the exemplary network system 200 of FIG. 3, the script modifier 210 can be hosted by, and can execute on, a server computing device 40 that is separate and apart from the server computing device 30 hosting the script file 63. For example, the computing devices 30 and 40 can be configured such that server computing device 40 acts as a proxy server for the server computing device 30, thereby causing the personal computing device 20, and specifically the web browser 21, to communicate with the server computing device 40 when attempting to communicate with the server computing device 30. The establishment of the server computing device 40 as a proxy server can be tailored to the development of the program comprising the client application 62 and the server application 61. For example, when a new version of the script file 63 is made available to clients, the server computing device 40 can be used as a proxy for the server computing device 30, enabling developers of the script file 63 the ability to troubleshoot the scripts by using the script modifier 210 in the manner described in detail below. Once the developers become comfortable with the performance of the script file 63, they can modify the proxy settings, and thereby enable the server computing device 30 to communicate directly with the personal computing device 20.

Figure 4:
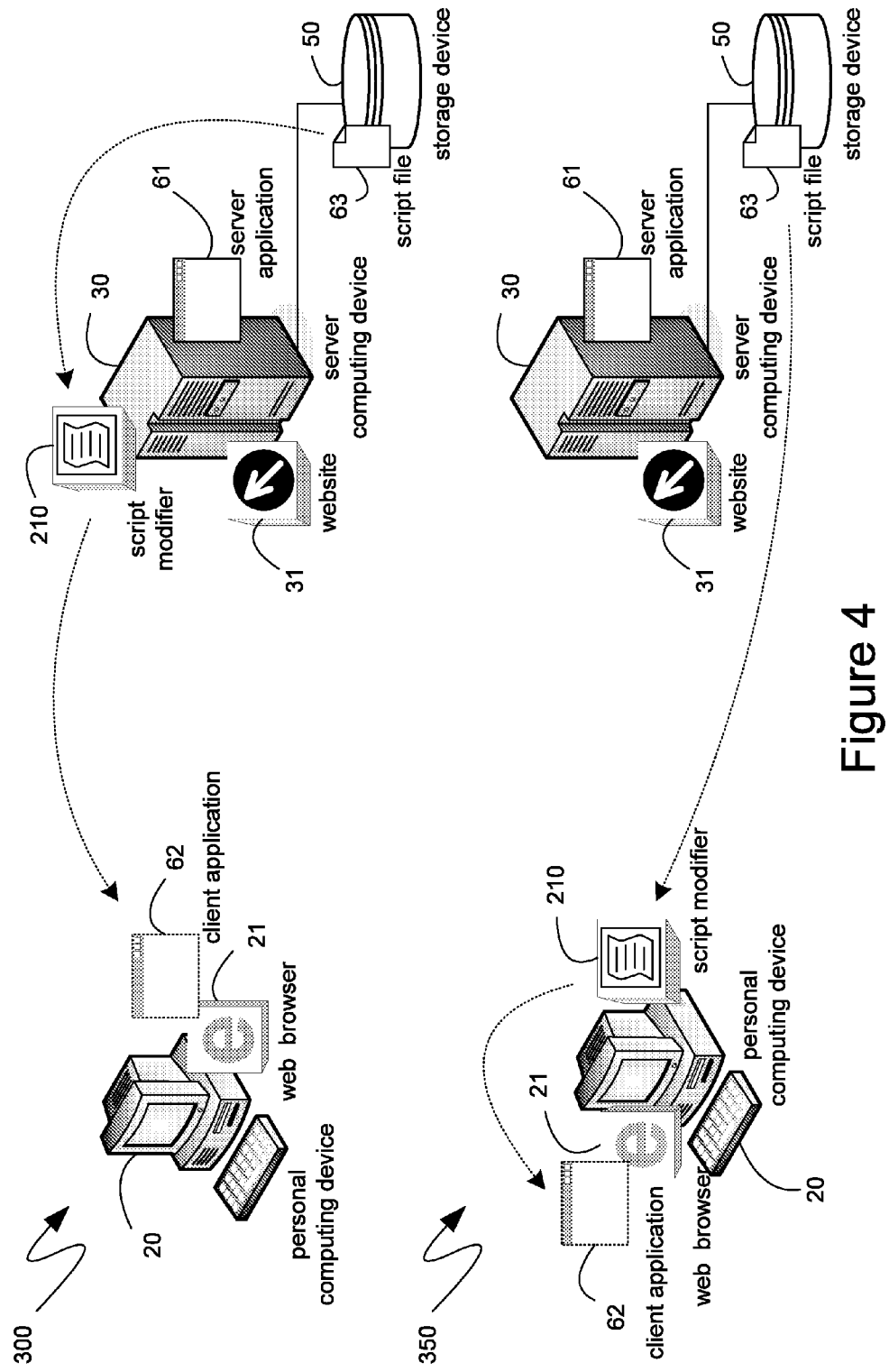
FIG. 4 comprises two block diagrams of alternative exemplary systems, both illustrating modification of software provided in real-time.

Utilizing the script modifier 210 through an independent server computing device 40 that can be used as a proxy server can enable third parties, independent of the developers of the script file 63, to provide debugging, optimization and monitoring services to a wide range of script authors. However, such an arrangement does add additional communicational complexity between the server computing device 30 and the end user on the personal computing device 20. Turning to FIG. 4, two additional exemplary network systems 300 and 350 are shown, illustrating alternative hosting of the script modifier 210. As illustrated by the exemplary network system 300, the script modifier 210 can reside on the same server computing device as the hosting website 21 and the script file 63 which will be modified. In such a case, the script modifier can be a module of the web server software that is part of the website 21. In the case where the web server software is distributed across many server computing devices, the script modifier modules may coordinate their modifications with each other. Alternatively, as illustrated by the exemplary network system 350, the script modifier 210 can reside on the same personal computing device as the web browser 21 hosting the scripts of the script file 63 which will be modified. While the script modifier 210 can act as a local proxy on the personal computing device 20, it can also be configured as a plug-in, or other extension, to the web browser 21.

The existence of the script modifier 210 need not require any changes to the web browser 21 or the website 31, as the script modifier 210 can operate such that the website 31 is unaware of any interception of the script file 63, and the web browser 21 is unaware that the scripts received are not the original scripts of the script file 63. To further provide for transparent operation, the script modifier 210 can pass through remote procedure calls, responses and other data that may be communicated between the client application 62 and the server application 61. However, additional downloads, by the web browser 21, of scripts, such as those contained within the script file 63, can likewise be intercepted by the script modifier 210.

Figure 5:
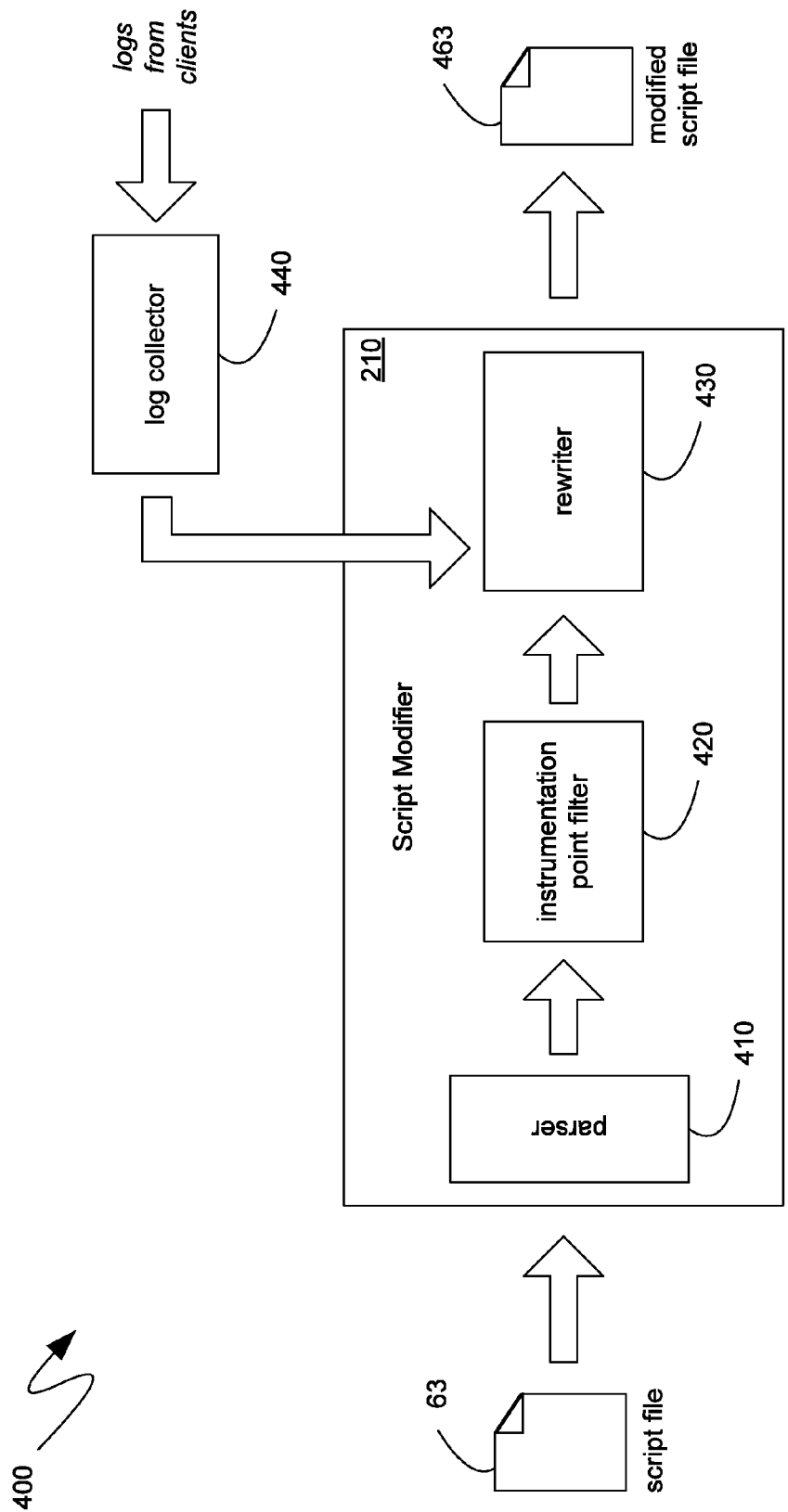
FIG. 5 is a block diagram of an exemplary instruction modification component.

Turning to FIG. 5, the operational flow 400 illustrates the components of the script modifier 210 with reference to the script file 63. As shown, the script file 63 can be received by a parser 410, which can, initially, identify the script file 63 as comprising scripts which can be modified by the script modifier 210. Subsequently, the parser 410 can identify instrumentation points within the scripts of the script file 63. In one embodiment, an "instrumentation point" can be any instance of a language element, such as a function declaration, statement, variable reference or the program as a whole. The identification of instrumentation points enables the parser 410 to generate an abstract syntax tree representation of the scripts contained within the script file 63 received by the script modifier 210. However, as indicated previously, while the descriptions are directed to script files, nothing in the descriptions relies on any aspect of any scripting language and, as such, the disclosures are equally applicable to binary files or other files not coded in a high-level language. In such cases, the parser can, instead of generating an abstract syntax tree representation, instead generate some other intermediate representation.

Returning to FIG. 5, the parser 410 provides the identified instrumentation points to the instrumentation point filter 420, which can identify the relevant instrumentation points depending on the one or more particular instrumentation policies being applied to the script file 63. For example, if the instrumentation policy being applied to the script file 63 was directed towards collecting information when an error occurred as part of the running of the client application 62, then the instrumentation point filter 420 could filter out instrumentation points such as conditional branches and loops and instead retain only those instrumentation points, such as the instrumentation points that register error handlers, that are relevant to the instrumentation policy. Alternatively, if the instrumentation policy being applied to the script file 63 was directed towards the detection of infinite loops, then the instrumentation point filter 420 would filter out instrumentation points that registered error handlers, and would instead retain those instrumentation points that dealt with loops, such as "for" loops and "while" loops.

The script modifier 210 is not limited to implementing only a single instrumentation policy at any given time or with respect to any given script or script file. Instead, the script modifier 210 can apply multiple instrumentation policies simultaneously. Thus, returning to the above examples, if the script modifier 210 was simultaneously applying both the instrumentation policy that collected error information and the instrumentation policy that detected infinite loops, then the instrumentation point filter 420 would retain for subsequent modification by the rewriter 430, both the instrumentation points directed to error handlers and the instrumentation points directed to loops.

Once the instrumentation point filter 420 has filtered out the instrumentation points identified by the parser 410 that are not relevant to the one or more instrumentation policies being applied by the script modifier 210 to the script file 63, the remaining instrumentation points can be provided to the rewriter 430 as shown in FIG. 5. The rewriter 430 can add additional instructions, or modify existing instructions, in accordance with the one or more instrumentation policies being applied by the script modifier 210. For example, if the script modifier 210 was implementing the instrumentation policy directed towards collecting further information regarding errors, then the instrumentation points which registered error handlers that were provided to the rewriter 430 by the instrumentation point filter 420 could be rewritten to include additional instructions that could collect relevant information, such as the value of the stack at the time of the error, and the particular instruction that caused the error, and store such information in a log. Thus, a modified script file 463 being output by the rewriter 430 could comprise instructions that registered an error handler and additional instructions that logged error-related information, such as stack values and faulting instructions. The modified script file 463 could then be provided to the browser 21 instead of the original script file 63, thereby implementing the instrumentation policy.

Information collected by instructions added by the rewriter can be periodically returned through standard communication mechanisms supported by the web browser 21 or other hosting software on the personal computing device 20. Such information can be received by a log collector 440, as shown in FIG. 5. Thus, returning again to the above example of an instrumentation policy directed to collecting additional information when an error occurs, the additional information collected by the instructions added by the rewriter 430 can be periodically provided to the log collector 440 by the web browser 21. In one embodiment, the rewriter 430 can, in addition to the inserted instructions described above, also insert appropriate instructions to provide for the uploading of logged information to the log collector 440 by the web browser 21.

Figure 6:
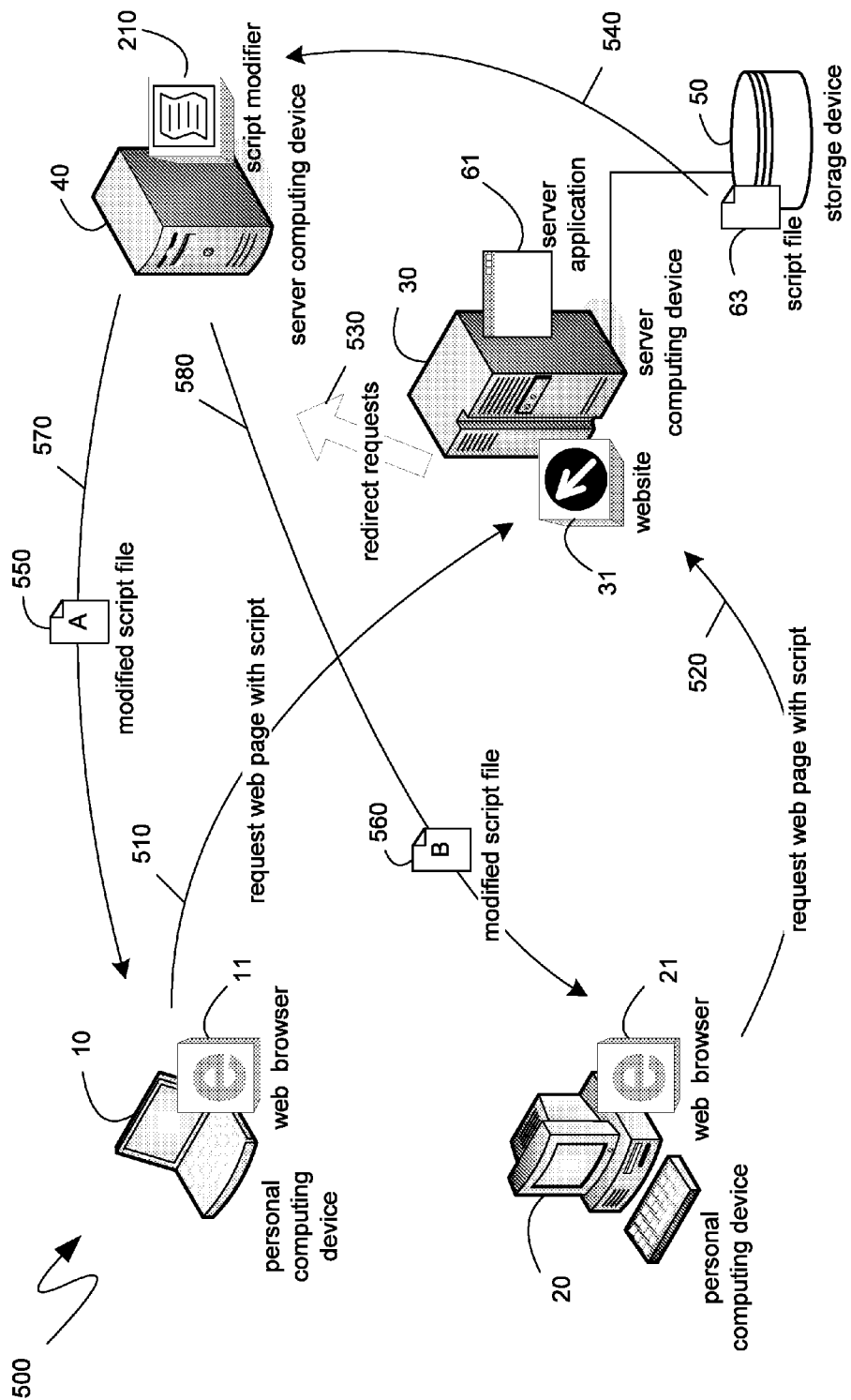
FIG. 6 is a communicational flow diagram of exemplary modifications of software provided in real-time to multiple recipients.

The instrumentation policy implemented by the script modifier 210 can be distributed across multiple downloads of the script file 63, thereby dividing the overhead consumed by the added instructions across multiple users, and minimizing the impact on any one user. Turning to FIG. 6, an exemplary communicational flow 500 is shown, illustrating the division of an instrumentation policy across multiple downloads of the script file 63. Initially, a web browser 11, executing on the personal computing device 10 can make a request 510 for a web page, comprising references to the script file 63, from the website 31. Analogously, another web browser 21, executing on the personal computing device 20, can make an equivalent request 520. If the script modifier 210 is being implemented on an independent server computing device 40, as shown in FIG. 6, then the website 31 can redirect the requests 510 and 520 to the server computing device 40. As will be known by those skilled in the art, the redirection 530 can comprise multiple communications between the server computing devices 30 and 40. However, for clarity, those communications are not shown in FIG. 6.

In responding to the requests 510 and 520, the script modifier 210 can intercept the communication 540 of the script file 63 and can insert additional instructions in accordance with the instrumentation policy. The first request 510 can be responded to with a modified script file 550 comprising additional instructions for some of the relevant instrumentation points, as would have been determined by the instrumentation point filter 420. The second request 520 can be responded to with a different modified script file 560 comprising additional instructions for others of the relevant instrumentation points. Thus, as shown in FIG. 6, the modified script file 550 can be provided to the web browser 11 via communications 570, while the modified script files 560 can be provided to the web browser 21 via communications 580. Each of the web browsers 11 and 21 will, therefore, be taxed to host only a portion of the additional instructions called for by the instrumentation policy, since each of the modified script files 550 and 560 only comprised a portion of those instructions.

For example, an instrumentation policy that searches for circular references between memory objects created by scripts and browser-generated web page objects can insert code at each instrumentation point that includes an instruction to which a web page object identifier is returned and can also insert code at each instrumentation point that represents a closure by the script. The inserted code need not do anything more than mark each web page object and each closure and can, therefore, add very little overhead to the modified scripts. However, to search for circular references, the instrumentation policy can also specify the insertion of code that checks all field stores of script objects to determine if they attempt to close an object referencing a web page object. Such code can noticeably impact the execution efficiency of the scripts if it were all inserted into a single modified script file.

Instead, however, the instruction point filter 420 can filter out all but some of the instruction points to which such code is to be added with each successive processing of the script file 63. Thus, the rewriter 430 would only be adding the searching code to a fraction of the relevant instruction points each time script file 63 was modified. If there were 10 instruction points that involved field stores, and therefore called for the addition of the checking code, the instruction point filter 420 could, when processing the script file 63 an initial time, pass along only five of those instruction points to the rewriter 430 to add in the checking code. Such modifications could result in the modified script file 550 of FIG. 6. When the script file 63 was processed a subsequent time by the script modifier 210, the instruction point filter 420 could filter out the five instruction points previously provided to the rewriter 430 and instead provide, to the rewriter, the instructions points involving field stores that were not previously passed along. The rewriter 430 would, then, add the checking code to these instruction points, generating a different modified script file 560 that can be provided to a different web browser 21. Thus, each of the modified script files 550 and 560 comprise only half of the checking code called for by the instrumentation policy, thereby spreading the execution of such code across multiple computing devices, or multiple instances of running the web application on a single computing device.

The selection of which instrumentation points to filter out, when the added code is being spread across multiple modified script files, can be performed by the instrumentation point filter 420 based on a random selection such that, statistically each instrumentation point will be passed by the filter 420 through to the rewriter 430 an equal amount of times across a sufficiently large number of downloads of the script file 63. In addition, specific instrumentation points can be marked such that they are no longer in the pool of available instrumentation points for the filter 420 to choose from and can, therefore, be filtered out each time. For example, the log collector 440 can receive information from the logs obtained from the execution of earlier modified script files that indicates that a particular instrumentation point has been adequately checked.

Such an instrumentation can be marked so that, with each subsequent download of the script file 63, the instruction point filter 420 filters that instruction point out each time, and only passes a selection of the remaining instruction points on to the rewriter 430.

Figure 7:
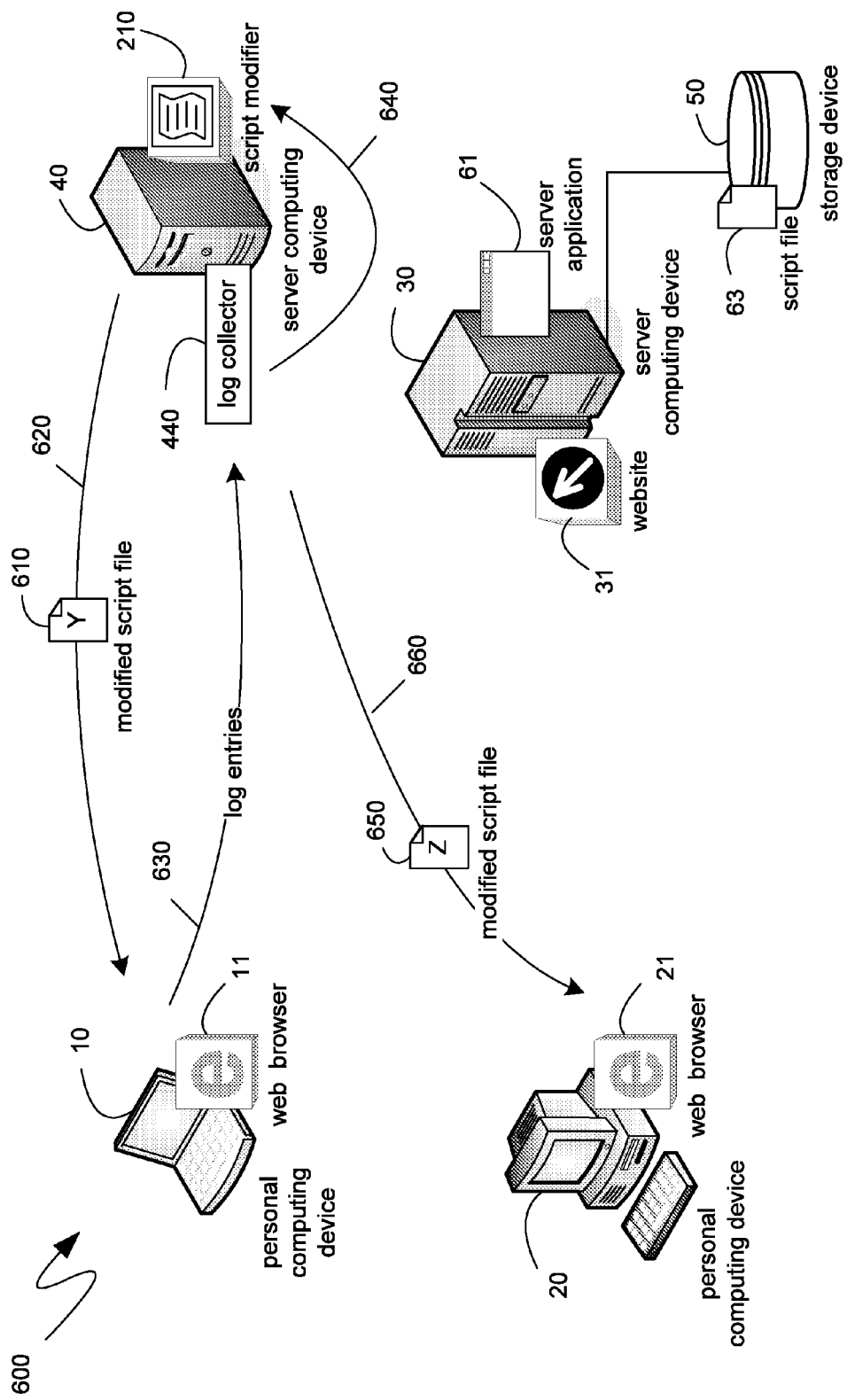
FIG. 7 is a communicational flow diagram of another form of exemplary modifications of software provided in real-time to multiple recipients.

The feedback received from previously supplied modified scripts can be used to inform the modification of the same script when downloaded in the future. Turning to FIG. 7, an exemplary communicational flow diagram 600 is shown, illustrating the incorporation of previously collected results into the subsequent modification of the same script file 63. In particular, a web browser 11 can request a web page from the website 31 that references the script file 63, causing the script file to be modified by the script modifier 210, generating modified script file 610. Modified script file 610 can then be sent to the web browser 11 via communication 620, as shown in FIG. 7. Subsequently, based on the instructions inserted by the script modifier 210 into the modified script file 610, the web browser 11 can be instruction to provide log entries from the added instructions to the log collector 440 via communication 630. Such log entries can comprise information which can be communicated to the script modifier via communication 640 and can be used by the script modifier to adjust the instrumentation policy accordingly.

If another web browser 21 were, at a later point in time, to request a web page from the website 31 that also references the script file 63, the script modifier 210 can generate a modified script file 650 reflecting an updated set of modifications, generated based on information received by the log collector 440 from prior modified script files 610. The modified script 650 could then be provided to the web browser 21 via communication 660 as shown in FIG. 7. The modified script file 650 could then, itself, provide log entries to the log collector 440 which could be used to further adjust the modifications performed by the script modifier 210. In one embodiment, the modified script file 650 need not even be sent to a different browser 21 from the browser 11 that received the modified script file 610. Instead, the modified script file 650 could be sent to the same browser 11 as the modified script file 610 when the browser 11 requested the script file 63 a subsequent time.

Adaptive modification of the script file 63 can enable detailed monitoring of specific aspects of the script file 63 without requiring a determination of those aspects in advance of the monitoring. For example, the instrumentation policy applied by the script modifier 210 can be directed towards the monitoring of the performance of the script file 63. Initially, the instrumentation point filter 420 can filter out all of the identified instrumentation points except those associated with the beginning and the end of whole blocks of script or event handlers. The rewriter 430 can then insert timing commands to measure the length of time each block of script or event handler takes to execute. Such timing information can be stored in a log file by other commands likewise inserted by the rewriter 430.

After such an initially modified script file has been executed by one or more browsers, the information received by the log collector 440 can identify blocks of script or event handlers whose execution time exceeded some predefined threshold. For a subsequent series of modifications to subsequent downloads of the script file 63, the instrumentation point filter 420 can filter out all of the identified instrumentation points except those associated with the identified blocks of script or event handlers that were too slow. Thus, the instrumentation points that were previously passed to the rewriter 430 will now be filtered out by the instrumentation point filter 420 as the information collected by the log collector 440 indicated that they no longer needed to be monitored. Instead, of the instrumentation points associated with the slow blocks of script or event handlers, a greater number of them can be provided to the rewriter 430, thereby enabling more specific timing of individual portions of the identified blocks of script and event handlers.

As with the initial round of modifications, the subsequent modifications directed to more precise timing of individual blocks of script or event handlers can likewise collect timing information in a log and forward it to the log collector 440. This subsequent round of timing information can be used to further refine the individual instructions or other more specific elements of the script file 63 that are to be timed in a subsequent series of modifications. In such a manner, precise timing information can be obtained regarding specific segments that may not be performing properly without burdening the browser with the amount of timing instructions that would have been needed if an iterative approach was not used.

While the above described examples refer to a log collector 440 that is part of the same computing device as the script modifier 210, no such co-location is required. For example, in one embodiment, a third party can operate a computing device, such as computing device 40, with one or more script modifiers, such as script modifier 210, and can, thereby, offer script modification services to script developers to enable those developers to test, debug and otherwise optimize their scripts. In such an embodiment, the log collector 440 can be resident on each of the individual server computing devices, such as server computing device 40, that are within the control of the script developers that are using the third party's services. In such a manner, the developers can directly receive feedback regarding their scripts. In an alternative embodiment, multiple log collectors can be used for a single log file. For example, the third party could design the rewriter 430 to insert code that instructs a hosting web browser to provide logged information, not only to the server computing device of the developer, but also to the server computing device hosting the script modifier 210, enabling the script modifier 210 to perform iterative modifications, such as those described above.

In an alternative embodiment, log files need not be provided to a log collector 440 merely because there is information present in the log file. Instead, the rewriter 430 can insert instructions that collect information that may be relevant or useful only if one or more specific events occur. For example, an instrumentation policy can be directed to the collection of relevant information in case one or more predetermined errors occurs. In such a case, the logged information can be provided to the log collector 440 only upon the occurrence of one or more of the predetermined errors, and the code inserted by the rewriter 430 can specify the occurrence of one or more of those errors as a precondition for uploading the logged information.

Figure 8:
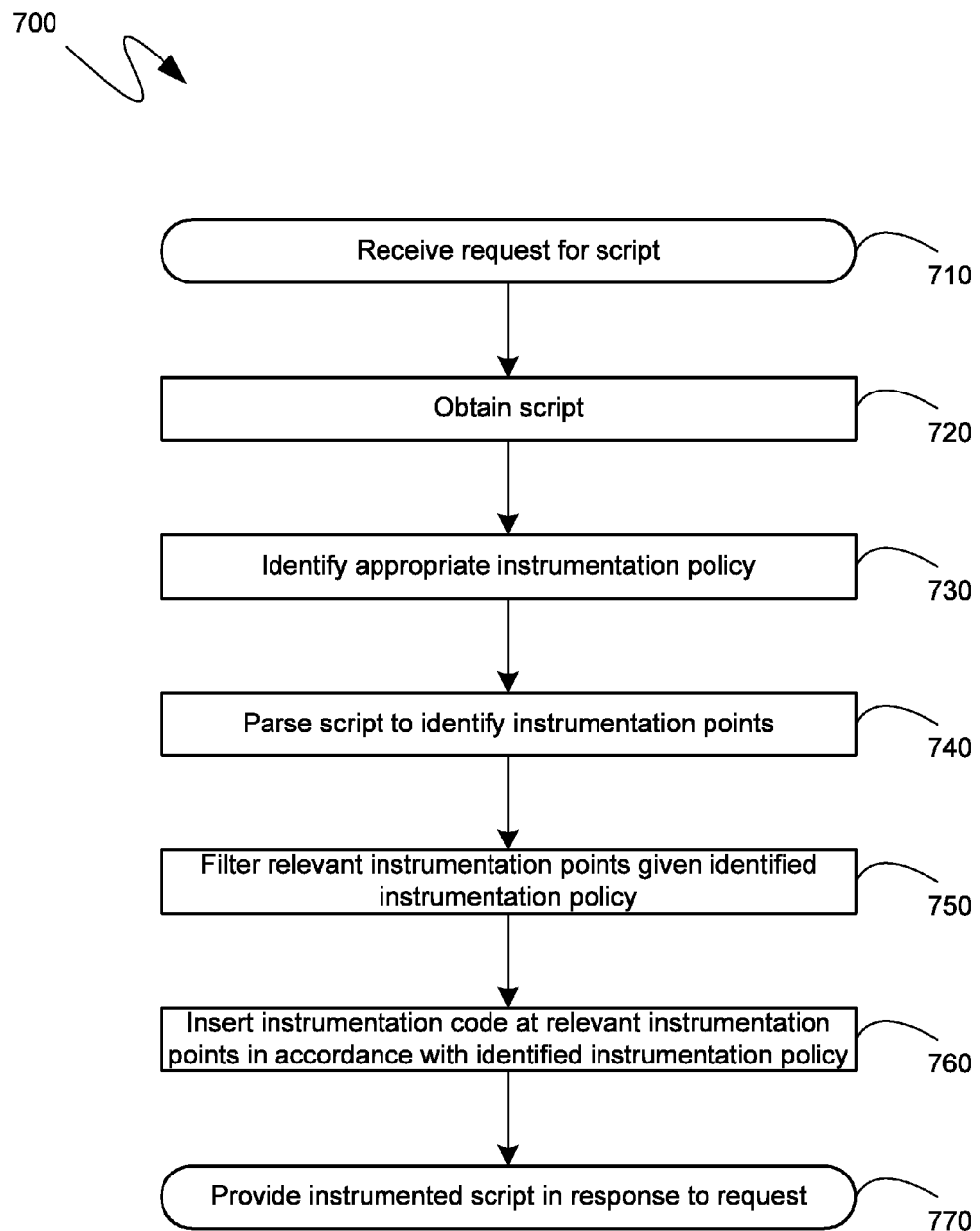
FIG. 8 is an exemplary instruction modification flow diagram.

Turning to FIG. 8, a flow diagram 700 is shown, illustrating an exemplary operation of the script modifier 210 according to one embodiment. Initially, a request for a script is received at step 710. As indicated previously, the request at step 710 can have initially been directed to a web server hosting web pages that reference script files, but can then have been redirected to a proxy server hosting the script modifier 210. Alternatively, the request received at step 710 can have been originally directed to the script modifier 210.

In either case, once the request is received at step 710, the script modifier 210 can obtain the script at step 720 and identify an appropriate instrumentation policy at step 730. As also indicated previously, more than one instrumentation policy may be applied to any given script and, as such, step 730 can identify more than one appropriate instrumentation policy. Subsequently, at step 740, the parser 410 can parse the script file 63 into an abstract syntax tree and can, thereby, identify instrumentation points in the scripts of the script file.

At step 750, the instrumentation point filter 420 can filter the relevant instrumentation points given the one or more instrumentation policies that are being used with the script file 63. The filtered instrumentation points can then have instrumentation code added to them, or can otherwise be modified in accordance with the identified instrumentation policy at step 760. For example, if the instrumentation policy is directed to the detection of infinite loops, then the instrumentation point filter 420 can, at step 750, filter out all of the identified instrumentation points except those directed to loops, such as "for" loops or "while" loops, and, at step 760, the rewriter 430 can insert, at each of the loop instrumentation points passed to it by the filter 420, instrumentation code that records the number of iterations that the loop has executed and instrumentation code that can terminate the loop if it exceeds a threshold number of iterations. Similarly, if the instrumentation policy was directed to the detection of inefficient string concatenation, then, at step 750, the instrumentation point filter 420 can filter out all of the identified instrumentation points other than those directed to string concatenation via possibly inefficient means, such as the use of the "+" operator and, at step 760, the rewriter 430 can insert instrumentation code that monitors the depth of the concatenated string to determine if the concatenation, for example, via the "+" operator, resulted in concatenated string whose depth is greater than necessary.

Figure 9:
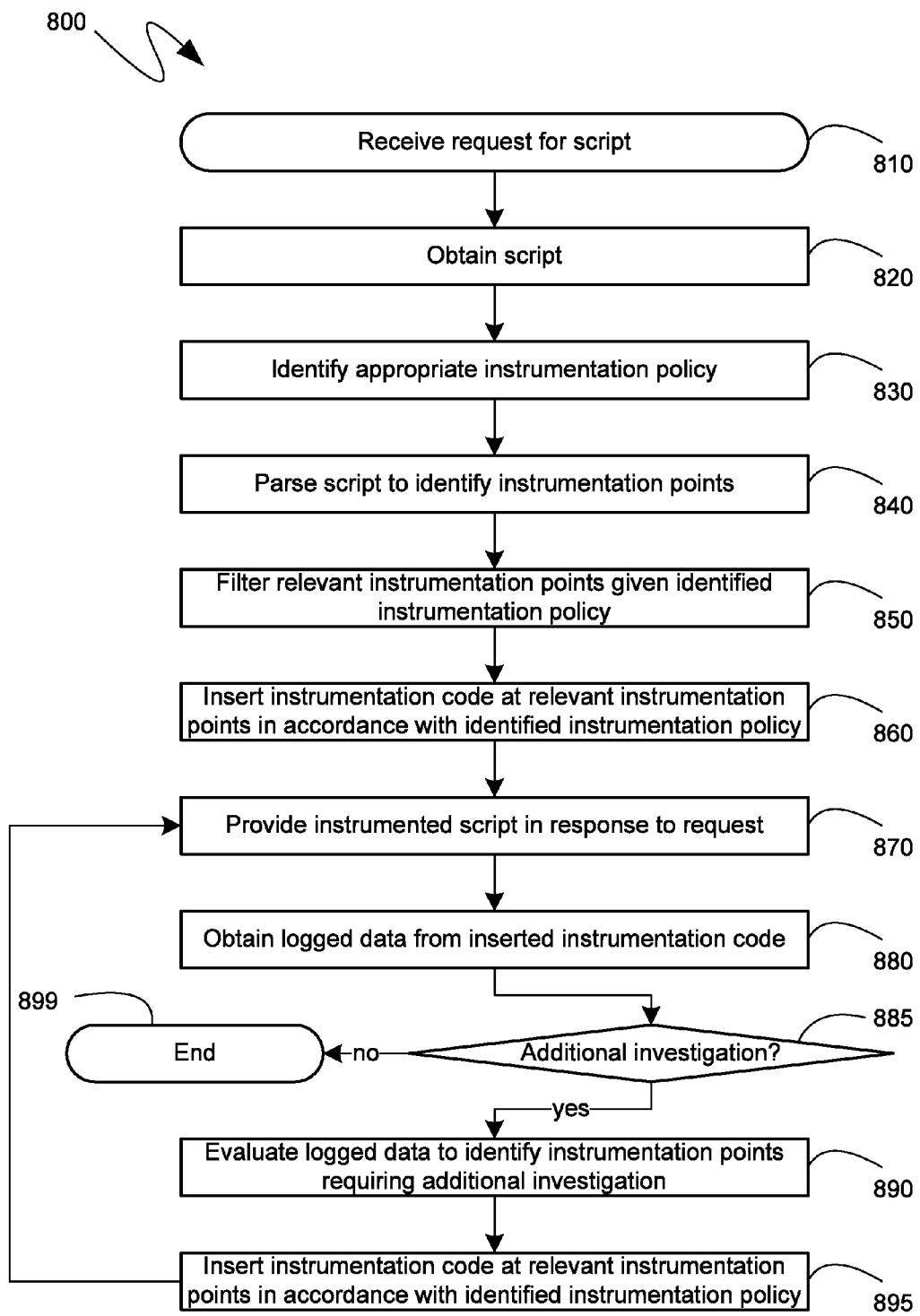
FIG. 9 is an exemplary iterative instruction modification flow diagram.

Once the relevant instrumentation points have been filtered at step 750, and once the instrumentation code has been inserted at step 760, the instrumented script can be provided to the requester at step 770 and, in one embodiment, thereby, end the operation of the script modifier 210. In an alternative embodiment, however, the operation of the script modifier 210 can be influenced by information received by prior modifications to the same script file modified in response to a prior request. Turning to FIG. 9, a flow diagram 800 illustrating the operation of the script modifier 210 according to an alternative embodiment is shown. The initial steps 810 through 860 mirror those described above with reference to steps 710 through 760. In particular, at step 810, a request for the script can be received by the script modifier 210, at step 820 the script modifier can obtain the script, and at step 830 it can identify the appropriate instrumentation policy for the script, as described previously in more detail with respect to steps 710 through 730. Similarly, as described above with respect to steps 740 through 760, the parser 410 can parse the script to identify instrumentation points at step 840, the instrumentation point filter 420 can filter the relevant instrumentation points at step 850, and at step 860, the rewriter 430 can insert instrumentation code in accordance with the identified instrumentation policy.

The instrumentation code inserted at step 860, however, can differ from the instrumentation code inserted at step 760 in that the instrumentation code inserted at step 860 can log information that can adjust the instrumentation policy for subsequent modifications of the same script file. Thus, at step 870, the instrumented script is provided in response to the request received at step 810, and, at step 880, the log collector 440 can obtain the data that was logged by the instrumentation code inserted at step 860. Using the received log data, the script modifier 210 can determine if additional investigation is required. For example, if the instrumentation policy was directed to identifying aspects of the instrumented scripts that were too slow, then the logged data received at step 880 could be timing information regarding whole script blocks and event handlers that was added at step 860. The timing information can identify event handlers or script blocks that appear to be too slow and, therefore, require additional investigation. If such additional investigation is required, as determined at step 885, then, at step 890, new instrumentation points can be identified that are associated with the additional investigation. For example, if a script block was identified as being too slow, then the instrumentation points associated with additional investigations identified at step 890 can be instrumentation points representing sub-components of the script block that was determined to be too slow. Those sub-components can then have timing code inserted in an analogous manner to the timing code that would have been inserted around the script blocks and event handlers at step 860. Such instrumentation code can be inserted at step 895 and the processing can then return to step 870 to provide the newly instrumented script to the requesting web browser. The iterative process would, thereby, repeat until, after obtaining logged data at step 880, it was determined, at step 885, that no further investigation was required, causing the processing to end at step 899, as shown.

In another embodiment, the script modifier 210 can operate in an iterative mode of operation that varies slightly from the one described above. Specifically, while the modifications applied to any given script can be informed by the data collected by prior modifications to the same script, as described above, the script modifier 210 can further distribute the modification across multiple modified scripts such that any one modified script comprises only a fraction of the modifications called for by the instrumentation policy.

Figure 10:
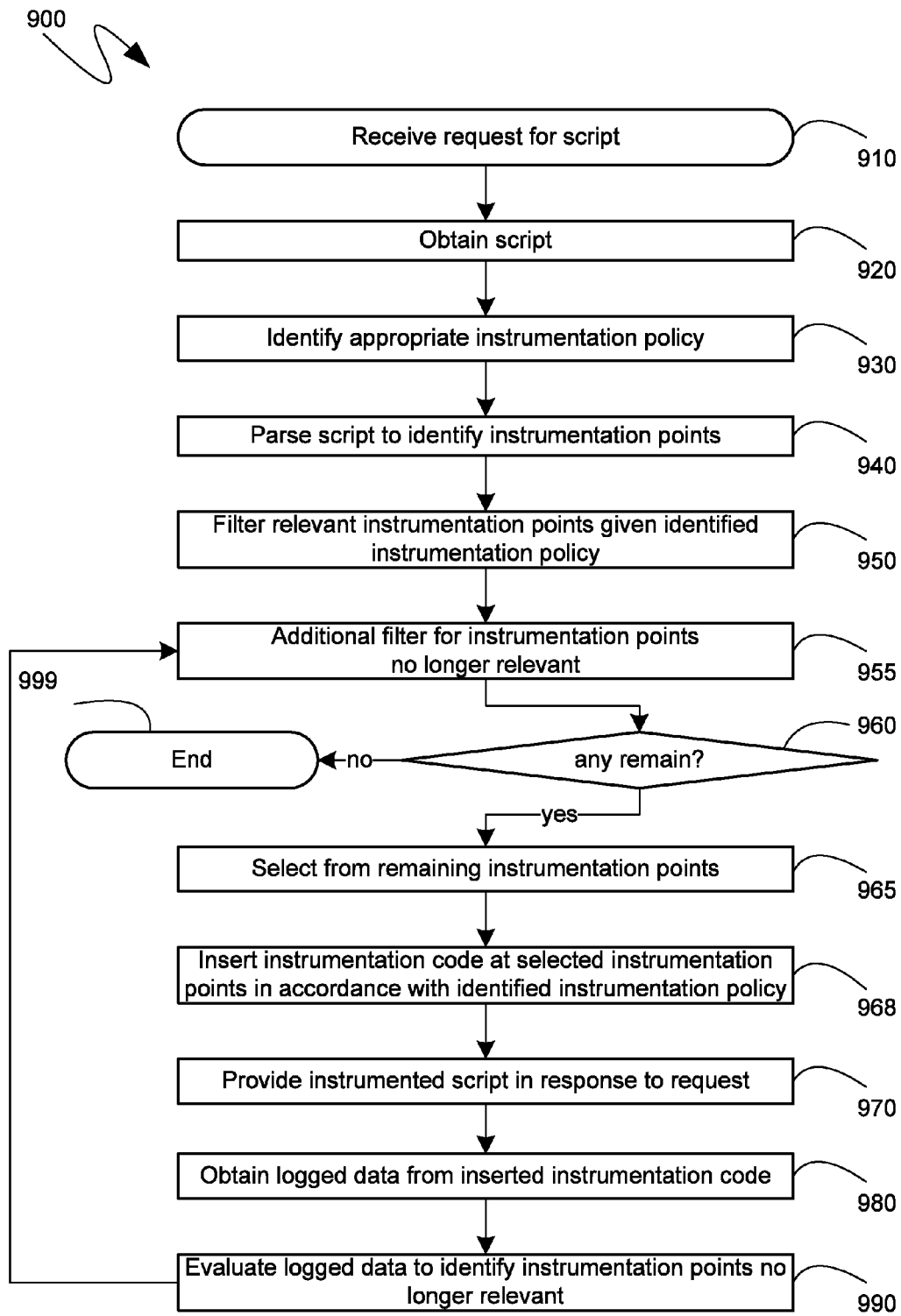
FIG. 10 is an exemplary instruction modification in parallel flow diagram.

Such an alternative iterative mode of operation is illustrated in FIG. 10, showing the flow diagram 900. The initial steps 910 through 940 can be analogous to the initial steps 810 through 840 and 710 through 740, respectively, already described in detail above. At step 910, the script modifier 210 can receive a request for a script file, at step 920, it can obtain the script file, at step 930 the appropriate instrumentation policy can be identified, and, at step 940, the parser 410 can parse the script file to identify instrumentation points. The instrumentation policy, however, can require the insertion of instrumentation code that can add a noticeable amount of overhead to the processing of the script files by the hosting browser. Consequently, the instrumentation point filter 420 can, at step 965, select from among the instrumentation points relevant for the applicable instrumentation policy, thereby distributing the instrumentation code across multiple modified script files, and avoiding overloading any one browser's processing of the modified script file.

Prior to selecting from among the relevant instrumentation points at step 965, the instrumentation point filter 420 can first, at step 950, filter the instrumentation points identified by the parser 410 at step 940 to retain only those instrumentation points that are relevant for the instrumentation policy being applied to the script file. Subsequently, at step 955, the instrumentation point filter 420 can determine if any of the filtered instrumentation points are still relevant in view of information that may have been collected from instrumentation code inserted into previous modifications applied to the same script file. If, at step 960, the instrumentation point filter 420 determines that relevant instrumentation points remain, then, at step 965, as indicated, it can select from among the remaining instrumentation points and provide those to the rewriter 430, which can, at step 968, insert instrumentation code at the selected instrumentation points. The modified script can then be provided, at step 970, in response to the request received at step 910. Subsequently, at step 980, information logged by the instrumentation code inserted at step 968 can be received by the log collector 440 and, at step 990, the received information can be evaluated to determine if any of the instrumentation points previously determined to be relevant at step 950 have now been sufficiently examined and do not need to be examined further and are, therefore, no longer relevant. Once none of the instrumentation points remain relevant, the decision at step 960 can determine to end processing at step 999.

For example, if the instrumentation policy identified at step 930 was directed to the detection of memory leaks, then one type of instrumentation point that would remain after the filtering of step 950 would be field store instructions that are to be checked to determine if they attempt to close an object referencing a web page object. The process of performing such a check can be computationally expensive and, consequently, of the instrumentation points that are to have such checking code added to them, only a sample of them can be selected at step 965 and passed to the rewriter 430 to insert the relevant code at step 968. However, after a quantity of modified versions of the script file have been transmitted to requesting browsers, the logged data received at step 980 can indicate that some instrumentation points have been sufficiently checked and no longer require checking. In particular, once a field store instruction has been determined that it does not close a heap object cycle that involves web page objects, there is no longer a need to continue checking that instruction. Consequently, such instrumentation points can be determined, at step 990, to no longer be relevant to the purposes of the instrumentation policy, and can be filtered out at step 955. The random selection at step 965, therefore, can be from among the remaining instrumentation points.

The division of instrumentation code, such as that illustrated by the flow diagram 900 of FIG. 10, can also be used to compare measurements across multiple executions of the modified script. For example, an instrumentation policy can be directed to the detection of performance differences between different types of browsers, operating systems, or other elements of the platform hosting the modified scripts. In such a case, the timing instructions inserted by the rewriter 430 can include commands for specifying the platform element when logging data. Subsequently, when the logs are received by the log collector 440, the script modifier 210 can compare the results from various platforms to determine if there are any differences between them.

As can be seen from the above descriptions, computer-executable instructions that are delivered on a real-time basis can be modified during the delivery process to include instrumentation instructions that can collect information regarding the execution of the delivered instructions on the destination platform. The instrumentation instructions can be spread across multiple delivery instances, and can be based on feedback received from previously modified and delivered instructions. In view of the many possible variations of the subject matter described herein, we claim as our invention all such embodiments as may come within the scope of the following claims and equivalents thereto.

We claim:

1. One or more computer-readable storage media, the one or more computer-readable storage media not being a signal, the one or more computer-readable storage media comprising computer-executable instructions for modifying an application program to provide for remote monitoring of a remotely executed portion of the application program, the computer-executable instructions directed to steps comprising:

intercepting, from a server associated with a network hosted portion of the application program, the remotely executed portion of the application program that was directed to a client that will execute the remotely executed portion of the application program, wherein each combination of the network hosted portion of the application program and the remotely executed portion of the application program comprise a distributed replicated copy of the application program, and wherein further the network hosted portion of the application program can interact with multiple remotely executed portions of the application program to form multiple distributed replicated copies of the application program;

parsing the intercepted remotely executed portion of the application program to identify instrumentation points therein, the parsing comprising generating an intermediate representation of the intercepted remotely executed portion of the application program and identifying the instrumentation points with reference to the generated intermediate representation;

modifying the remotely executed portion of the application program to provide for instrumentation computer-executable instructions associated with at least one of the identified instrumentation points in accordance with one or more instrumentation policies, the inserted instrumentation computer-executable instructions comprising logging computer-executable instructions for recording information in a log and transmitting the logged information to a log collector, the modifying being adjusted according to information received by the log collector from previous instrumentation computer-executable instructions that were provided for by previously modified remotely executed portions of the application program, and the modifying comprising deleting one or more computer-executable instructions from the received remotely executed portion of the application program; and delivering the remotely executed portion of the application program without modification if the client is not a predetermined client subject to receiving modified remotely executed portions of the application program.

2. The computer-readable storage media of claim 1 comprising further computer-executable instructions directed to selecting a subset from among the identified instrumentation points such that at least two received remotely executed portions of the application program will have different subsets selected from among the identified instrumentation points; wherein the modifying the remotely executed portion of the application program comprises providing for instrumentation computer-executable instructions associated with only the selected subset of identified instrumentation points.

3. The computer-readable storage media of claim 1, wherein the instrumentation computer-executable instructions monitor the interactions of a user with the application program.

4. The computer-readable storage media of claim 1, wherein the remotely executed portion of the application program comprises scripts hosted by a browser; and wherein the instrumentation computer-executable instructions are script-based instructions.

5. A method for modifying an application program to provide for remote monitoring of a remotely executed portion of the application program comprising the steps of:

intercepting, from a server associated with a network hosted portion of the application program, the remotely executed portion of the application program that was directed to a client that will execute the remotely executed portion of the application program, wherein each combination of the network hosted portion of the application program and the remotely executed portion of the application program comprise a distributed replicated copy of the application program, and wherein further the network hosted portion of the application program can interact with multiple remotely executed portions of the application program to form multiple distributed replicated copies of the application program;

parsing the intercepted remotely executed portion of the application program to identify instrumentation points therein, the parsing comprising generating an intermediate representation of the intercepted remotely executed portion of the application program and identifying the instrumentation points with reference to the generated intermediate representation; and modifying the remotely executed portion of the application program to provide for instrumentation computer-executable instructions associated with at least one of the identified instrumentation points in accordance with one or more instrumentation policies, the inserted instrumentation computer-executable instructions comprising logging computer-executable instructions for recording information in a log and transmitting the logged information to a log collector, the modifying being adjusted according to information received by the log collector from previous instrumentation computer-executable instructions that were provided for by previously modified remotely executed portions of the application program, and the modifying comprising deleting one or more computer-executable instructions from the received remotely executed portion of the application program; and delivering the remotely executed portion of the application program without modification if the client is not a predetermined client subject to receiving modified remotely executed portions of the application program.

6. The method of claim 5 further comprising the steps of selecting a subset from among the identified instrumentation points such that at least two remotely executed portions of the application program will have different subsets selected from among the identified instrumentation points; wherein the modifying the remotely executed portion of the application program comprises providing for instrumentation computer-executable instructions associated with only the selected subset of identified instrumentation points.

7. The method of claim 5, wherein the instrumentation computer-executable instructions monitor the interactions of a user with the application program.

8. The method of claim 5, wherein the remotely executed portion of the application program comprises scripts hosted by a browser; and wherein the instrumentation computer-executable instructions are script-based instructions.

9. A system for modifying an application program to provide for remote monitoring of a remotely executed portion of the application program, the system comprising:

one or more server computing devices comprising a network hosted portion of the application program such that each combination of the network hosted portion of the application program and a remotely executed portion of the application program comprise a distributed replicated copy of the application program, and wherein further the network hosted portion of the application program can interact with multiple remotely executed portions of the application program to form multiple distributed replicated copies of the application program;

one or more log collectors for receiving information from inserted instrumentation computer-executable instructions; and one or more computer-readable media comprising computer-executable instructions for real-time modification of delivered application programs, the computer-executable instructions directed to steps comprising: intercepting the remotely executed portion of the application program from the one or more server computing devices; parsing the intercepted remotely executed portion of the application program to identify instrumentation points therein, the parsing comprising generating an intermediate representation of the intercepted remotely executed portion of the application program and identifying the instrumentation points with reference to the generated intermediate representation; modifying the remotely executed portion of the application program to provide for instrumentation computer-executable instructions associated with the at least one of the identified instrumentation points in accordance with one or more instrumentation policies, the inserted instrumentation computer-executable instructions comprising logging computer-executable instructions for recording information in a log and transmitting the logged information to the one or more log collectors, the modifying being adjusted according to information received by the one or more log collectors from previous instrumentation computer-executable instructions that were provided for by previously modified remotely executed portions of the application program, and the modifying comprising deleting one or more computer-executable instructions from the received remotely executed portion of the application program; and delivering the remotely executed portion of the application program without modification if the client is not a predetermined client subject to receiving modified remotely executed portions of the application program.

10. The system of claim 9 further comprising a proxy server computing device separate from the one or more server computing devices, the proxy server computing device comprising the one or more computer-readable media having the computer-executable instructions for real-time modification of delivered application programs encoded thereon.

11. The system of claim 10, wherein the one or more log collectors are co-located with the one or more server computing devices.

12. The system of claim 9, wherein the log collectors and the one or more computer-readable media having the computer-executable instructions for real-time modification of delivered application programs encoded thereon are co-located with the one or more server computing devices.

13. The system of claim 9, wherein the one or more computer-readable media having the computer-executable instructions for real-time modification of delivered application programs encoded thereon are co-located with one or more client computing devices that receive and execute the remotely executed portion of the application program.

14. The system of claim 9, wherein the one or more server computing devices comprise computer-readable media having computer-executable instructions encoded thereon for receiving a request from a client for the remotely executed portion of the application program and for redirecting the client's request to the one or more computer-readable media comprising the computer-executable instructions for real-time modification of delivered application programs.

* * * * *